(12) United States Patent
Kumagai et al.

(10) Patent No.: US 9,279,679 B2
(45) Date of Patent: Mar. 8, 2016

(54) CONSTRUCTION MACHINE CONTROL METHOD AND CONSTRUCTION MACHINE CONTROL SYSTEM

(75) Inventors: Kaoru Kumagai, Itabashi-ku (JP); Jun-ichi Kodaira, Itabashi-ku (JP); Raymond M. O'Connor, Livermore, CA (US)

(73) Assignee: Kabushiki Kaisha TOPCON, Tokyo-to (JP)

( * ) Notice: Subject to any disclaimer, the term of this patent is extended or adjusted under 35 U.S.C. 154(b) by 686 days.

(21) Appl. No.: 13/610,942

(22) Filed: Sep. 12, 2012

(65) Prior Publication Data

US 2014/0074295 A1   Mar. 13, 2014

(51) Int. Cl.
| | | |
|---|---|---|
| G01C 15/00 | (2006.01) | |
| G05D 1/02 | (2006.01) | |
| E01C 19/00 | (2006.01) | |

(52) U.S. Cl.
CPC .............. *G01C 15/00* (2013.01); *E01C 19/006* (2013.01); *G05D 1/0236* (2013.01)

(58) Field of Classification Search
CPC ..... E01C 19/006; G05D 1/0236; G01C 15/00
USPC .................... 700/275, 166; 382/103, 189, 289
See application file for complete search history.

(56) References Cited

U.S. PATENT DOCUMENTS

| | | | |
|---|---|---|---|
| 5,729,453 A | | 3/1998 | Lee et al. |
| 5,729,475 A | * | 3/1998 | Romanik, Jr. ................. 702/150 |
| 5,767,960 A | | 6/1998 | Orman |
| 5,771,978 A | * | 6/1998 | Davidson ............. G01C 15/002 172/2 |
| 5,774,207 A | | 6/1998 | Yoshida et al. |
| 6,286,607 B1 | | 9/2001 | Ohtomo et al. |
| 6,473,167 B1 | * | 10/2002 | Odell .......................... 356/141.4 |
| 6,530,720 B1 | * | 3/2003 | Green .......................... 404/84.1 |

(Continued)

FOREIGN PATENT DOCUMENTS

| | | | | |
|---|---|---|---|---|
| FR | 2640760 | * | 6/1990 | ................ G01S 1/70 |
| JP | 06051050 | * | 2/1994 | ................ G01S 5/16 |

(Continued)

OTHER PUBLICATIONS

Notice of Allowance mailed Apr. 11, 2014 in co-pending U.S. Appl. No. 13/610,945.

*Primary Examiner* — Carlos Ortiz Rodriguez
*Assistant Examiner* — Olvin Lopez Alvarez
(74) *Attorney, Agent, or Firm* — Nields, Lemack & Frame, LLC

(57) ABSTRACT

A construction machine control system comprises a laser surveying instrument for projecting a laser beam in rotary irradiation at constant speed and a construction machine for operating in a photodetection range of the laser beam, and in the construction machine control system, the construction machine comprises a working mechanical unit for carrying out construction operation, a machine control device for controlling the working mechanical unit, and at least three beam detectors which are disposed at known positions with respect to a device reference position of the construction machine and have a photodetector for receiving the laser beam and a direction of the construction machine is calculated based on photodetection timing of each of the beam detectors and the machine control device controls the working mechanical unit so that direction of the construction machine is set to a condition as required based on a result of calculation.

15 Claims, 9 Drawing Sheets

(56) References Cited

U.S. PATENT DOCUMENTS

| | | | |
|---|---|---|---|
| 6,672,797 B1* | 1/2004 | Zachman et al. | 404/84.5 |
| 6,917,415 B2* | 7/2005 | Gogolla et al. | 356/5.06 |
| 6,947,820 B2 | 9/2005 | Ohtomo et al. | |
| 7,022,962 B2 | 4/2006 | Ohtomo et al. | |
| 7,081,606 B2 | 7/2006 | Osaragi et al. | |
| 7,110,102 B2 | 9/2006 | Ohtomo et al. | |
| 8,068,962 B2 | 11/2011 | Colvard | |
| 2001/0023766 A1* | 9/2001 | Ohtomo et al. | 172/4.5 |
| 2004/0125365 A1 | 7/2004 | Ohtomo et al. | |
| 2005/0216167 A1 | 9/2005 | Nozawa et al. | |
| 2006/0198700 A1 | 9/2006 | Maier et al. | |
| 2007/0058161 A1* | 3/2007 | Nichols et al. | 356/139.01 |
| 2007/0263202 A1* | 11/2007 | Ohtomo et al. | 356/4.01 |
| 2008/0252907 A1* | 10/2008 | Sehr | 356/623 |
| 2009/0144995 A1* | 6/2009 | Yahagi | G01C 15/00 33/293 |
| 2009/0171610 A1* | 7/2009 | Haijima et al. | 702/95 |
| 2009/0235543 A1* | 9/2009 | Hayashi | G01C 3/02 33/293 |
| 2010/0020180 A1* | 1/2010 | Hill et al. | 348/188 |
| 2010/0085581 A1* | 4/2010 | Barbier et al. | 356/615 |
| 2010/0149524 A1* | 6/2010 | Mayer et al. | 356/138 |
| 2010/0215433 A1* | 8/2010 | Fritz | 404/84.5 |
| 2010/0229409 A1* | 9/2010 | Kumagai et al. | 33/285 |
| 2010/0299014 A1 | 11/2010 | Bouvier | |
| 2011/0169948 A1* | 7/2011 | Ohtomo et al. | 348/135 |
| 2013/0155224 A1* | 6/2013 | Ohtomo et al. | 348/136 |
| 2014/0074361 A1 | 3/2014 | O'Connor et al. | |
| 2014/0376768 A1* | 12/2014 | Troy et al. | 382/103 |

FOREIGN PATENT DOCUMENTS

| | | |
|---|---|---|
| JP | 2004-212058 A | 7/2004 |
| JP | 2008-531888 A | 8/2008 |
| JP | 4416925 B2 | 2/2010 |
| WO | 2006/092441 A1 | 9/2006 |

* cited by examiner

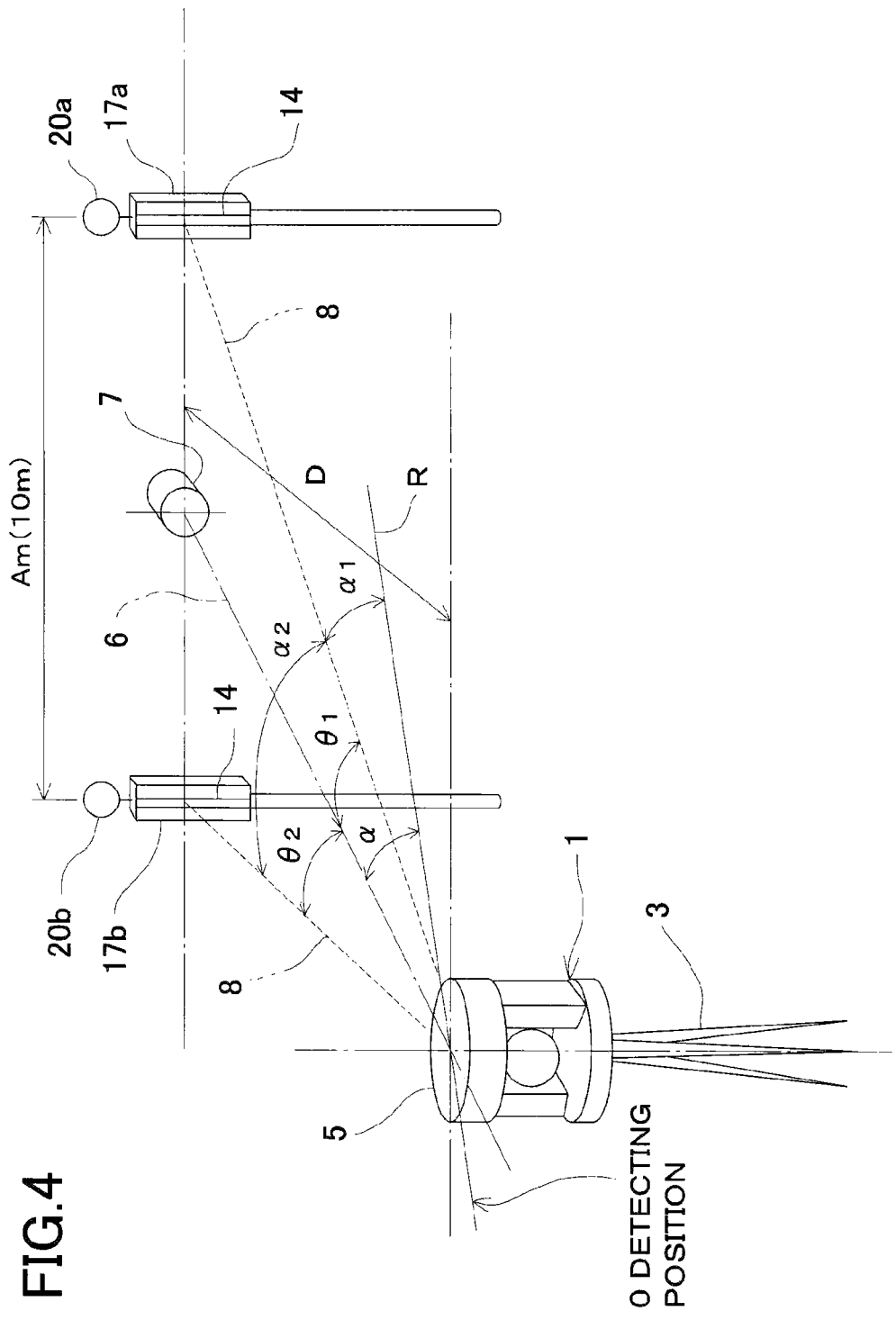

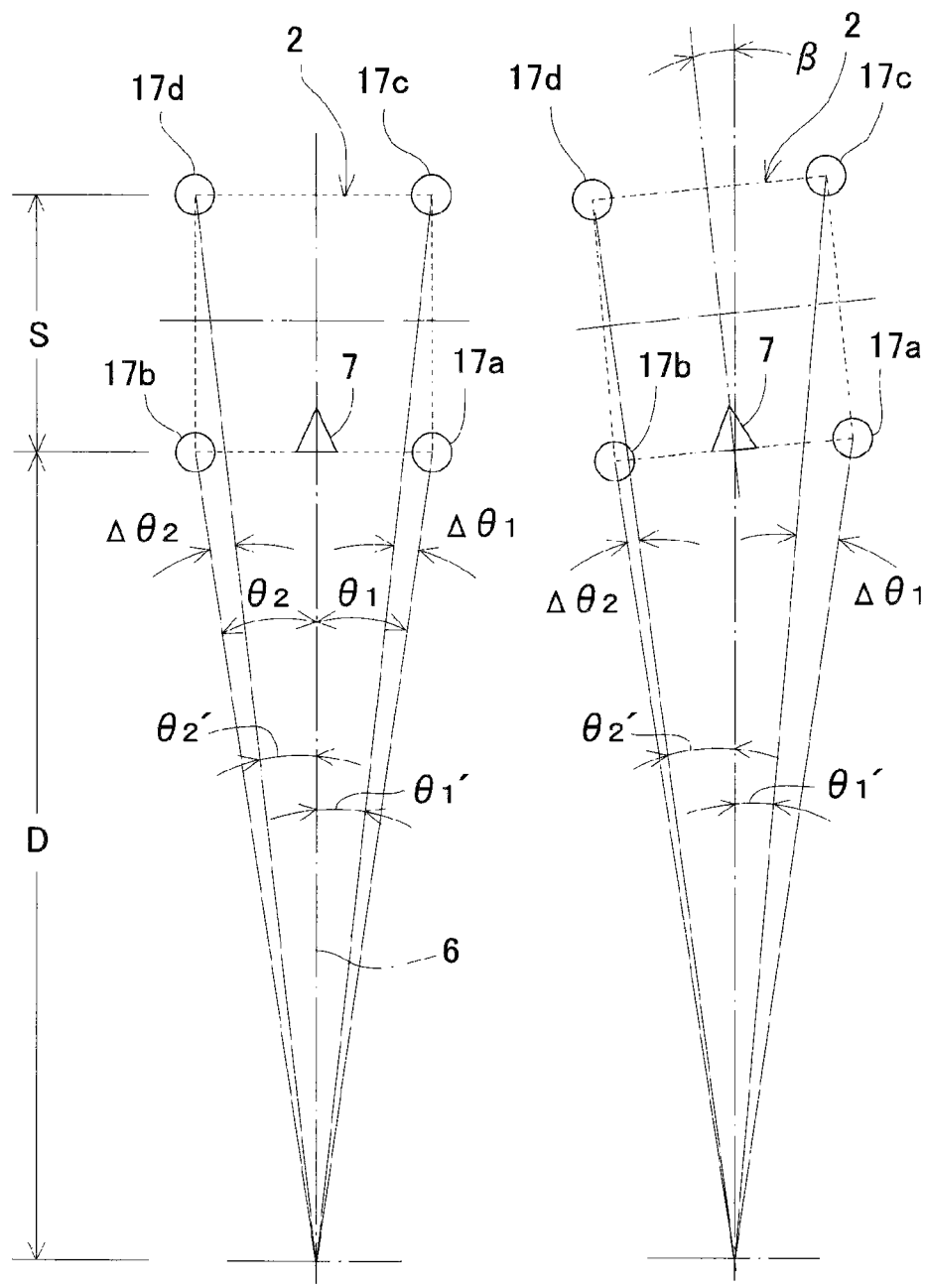

CONSTRUCTION MACHINE CONTROL METHOD AND CONSTRUCTION MACHINE CONTROL SYSTEM

BACKGROUND OF THE INVENTION

The present invention relates to a construction machine control method and a construction machine control system for controlling direction, posture, and other features of a construction machine.

As a construction machine, a slip-form paving machine is known, which is used for continuously paving concrete slabs by slip-form technical method, for instance.

The slip-form technical method is a method for continuously constructing a structure having the same cross-section by mounting a steel mold on a molding machine, by charging the concrete into the mold, and by carrying out compaction molding, and at the same time, by moving the molding machine forward.

In a case where the slip-form paving machine continuously paves concrete slabs, high accuracy is required for surface finishing, and this finishing accuracy should generally be in the grade of accuracy of several millimeters.

A conventional type control system for the slip-form paving machine is disclosed in the Japanese Patent Publication JP-A-2008-531888. In the control system for construction machine as disclosed in JP-A-2008-531888, at least two reflectors and two tilt sensors are provided at predetermined positions on the slip-form paving machine, and further, at least two position measuring devices corresponding to each of the reflectors are installed at known positions. Based on the positions of at least two reflectors measured by the position measuring device, and also, based on tilting detected by the two tilt sensors, posture of the slip-form paving machine is detected, and the slip-form paving machine is controlled according to this result of the detection.

In the conventional type construction machine control system as described above, a plurality of position measuring devices are needed, and re-positioning of the position measuring device must be repeatedly performed each time the procedure for a predetermined range of construction is completed. Therefore, working procedure is complicated and requires much time. For the purpose of acquiring position and posture of the slip-form paving machine based on the results of a plurality of measurements obtained by a plurality of position measuring devices and also based on the results of detection of the tilt sensor, a plurality of communication systems are required or the like and system configuration is complicated.

SUMMARY OF THE INVENTION

It is an object of the present invention to provide a construction machine control method and a construction machine control system, which are simple system configuration, and by which installation can be easily carried out.

A construction machine control method according to the present invention comprises a step of projecting a laser beam in rotary irradiation at constant speed by a laser surveying instrument, a step of detecting the laser beam by at least three beam detectors which are installed at known positions of a construction machine operated within a photodetection range of the laser beam and have a photodetector to receive the laser beam, a step of obtaining photodetection timing of each of the beam detectors based on results of detection of the laser beam by the at least three beam detectors, and a step of calculating direction of the construction machine with respect to the laser surveying instrument based on at least three photodetection timings as obtained.

Further, in the construction machine control method according to the present invention, a horizontal angle of each of the beam detectors with respect to the laser surveying instrument is obtained based on photodetection timing of the at least three beam detectors, and direction of the construction machine is calculated based on the at least three horizontal angles as obtained.

Further, in the construction machine control method according to the present invention, cross-section of luminous flux of the laser beam is in spot-like shape, the photodetector of the beam detector has a predetermined length in up-and-down direction, and the construction machine control method further comprises a step of detecting photodetecting positions of the laser beam by the beam detectors and detecting heights of the beam detectors based on the photodetecting position, and a step of calculating a tilting and a tilting direction of the construction machine based on at least three results of detection of the height.

Further, in the construction machine control method according to the present invention, there is provided a GPS device corresponds to each of the beam detectors, and the construction machine control method further comprises a step of acquiring time of the moment when the beam detector detects the laser beam from the GPS device as a time stamp, and of putting a time stamp to each of the photodetection signals of the beam detectors, and the photodetection timing is acquired by the time stamp.

Further, the construction machine control method according to the present invention comprises a step of projecting a modulated light as modulated to a predetermined frequency by the laser surveying instrument, a step of detecting a modulated frequency from the modulated light, and of acquiring a time moment when the beam detector receives the laser beam by using the modulated frequency as a time stamp.

Further, in the construction machine control method according to the present invention, the laser surveying instrument has electronic distance measuring function, and the modulated light is a distance measuring light.

Further, in the construction machine control method according to the present invention, the modulated frequency for preparing the time stamp is further superimposed on the distance measuring light.

Further, in the construction machine control method according to the present invention, the laser surveying instrument is installed at a known point, and the laser surveying instrument has distance measuring function and tracking function, and the construction machine control method comprises a step of measuring a predetermined position of the construction machine by the laser surveying instrument, and a step of detecting loci of moving of the construction machine based on a result of position measurement.

Further, a construction machine control system according to the present invention comprises a laser surveying instrument for projecting a laser beam in rotary irradiation at constant speed and a construction machine for operating in a photodetection range of the laser beam, and in the construction machine control system, the construction machine comprises a working mechanical unit for carrying out construction operation, a machine control device for controlling the working mechanical unit, and at least three beam detectors which are disposed at known positions with respect to a device reference position of the construction machine and have a photodetector for receiving the laser beam and a direction of the construction machine is calculated based on photodetection timing of each of the beam detectors and the machine control device controls the working mechanical unit so that direction of the construction machine is set to a condition as required based on a result of calculation.

Further, in the construction machine control system according to the present invention, the construction machine has a machine communication unit, the laser surveying instrument has a surveying control device and a surveying communication unit, a posture control unit is provided on either one of the construction machine or the laser surveying instrument, one of the at least three beam detectors transmits result of photodetection of the laser beam to the laser surveying instrument or the machine control device and obtains a horizontal angle of each of the beam detectors based on photodetection timing of each of the beam detectors, the posture detecting unit determines direction of the construction machine based on the horizontal angle, and the machine control device controls the working mechanical unit so that direction of the construction machine is set to a condition as required.

Further, in the construction machine control system according to the present invention, cross-section of luminous flux of the laser beam is in spot-like shape, the photodetector has a predetermined length in up-and-down direction, and the laser surveying instrument or the machine control device detects height of each of the beam detectors based on the result of photodetection by each of the beam detectors, calculates tilting and tilting direction of the construction machine based on the detected height, and controls the working mechanical unit so that tilting of the construction machine is set to a condition as required based on the result of calculation.

Further, in the construction machine control system according to the present invention, the laser surveying instrument is installed at a known point, the laser surveying instrument has distance measuring function and tracking function, a target is installed at a known position of the construction machine, and a distance measuring light is projected toward the target, and working position of the construction machine is measured.

Further, in the construction machine control system according to the present invention, GPS devices are installed respectively correspond to the beam detectors, time of the moment when the beam detectors receive the laser beam is detected from the GPS device as a time stamp, and horizontal angle of each of the beam detectors is obtained according to the time stamp added to results of photodetection.

Further, in the construction machine control system according to the present invention, the laser surveying instrument projects a distance measuring light as modulated, the target has a photodetection element to detect the distance measuring light, the machine control device detects modulated wave from a signal outputted from the photodetection element, the modulated wave is used as a time stamp at a moment when the beam detector detects the laser beam, and horizontal angle of each of the beam detectors is obtained based on the time stamp corresponding to the result of photodetection.

Further, in the construction machine control system according to the present invention, an error curve is obtained in advance over total circumference with respect to an elevation angle which the beam detectors can detect by detecting the laser beam, and the laser surveying instrument or the machine control device corrects a height thus detected according to the error curve.

According to the present invention, the construction machine control method comprises a step of projecting a laser beam in rotary irradiation at constant speed by a laser surveying instrument, a step of detecting the laser beam by at least three beam detectors which are installed at known positions of a construction machine operated within a photodetection range of the laser beam and have a photodetector to receive the laser beam, a step of obtaining photodetection timing of each of the beam detectors based on results of detection of the laser beam by the at least three beam detectors, and a step of calculating direction of the construction machine with respect to the laser surveying instrument based on at least three photodetection timings as obtained. As a result, it is possible to detect direction of the construction machine by a laser rotary projecting device and by at least three beam detectors and the cost of facilities is extensively reduced. Also, it is possible to control the operation in wide range where the laser beam can be detected, and the burden of re-installation procedure is considerably decreased. Further, if visual fields are assured of the laser surveying instrument and the beam detectors, there is no restrictive option in selecting the working place.

Further, according to the present invention, in the construction machine control method, a horizontal angle of each of the beam detectors with respect to the laser surveying instrument is obtained based on photodetection timing of the at least three beam detectors, and direction of the construction machine is calculated based on the at least three horizontal angles as obtained. As a result, direction of the construction machine can be detected by simple arrangement, and the cost of the facilities is extensively reduced.

Further, according to the present invention, in the construction machine control method, cross-section of luminous flux of the laser beam is in spot-like shape, the photodetector of the beam detector has a predetermined length in up-and-down direction, and the construction machine control method further comprises a step of detecting photodetecting positions of the laser beam by the beam detectors and detecting heights of the beam detectors based on the photodetecting position, and a step of calculating a tilting and a tilting direction of the construction machine based on at least three results of detection of the height. As a result, tilting of the construction machine can be detected in simple manner without using detecting means such as tilting sensor.

Further, according to the present invention, in the construction machine control method, there is provided a GPS device corresponds to each of the beam detectors, and the construction machine control method further comprises a step of acquiring time of the moment when the beam detector detects the laser beam from the GPS device as a time stamp, and of putting a time stamp to each of the photodetection signals of the beam detectors, and the photodetection timing is acquired by the time stamp. As a result, in a case where the difference of photodetection time between each of the beam detectors is detected, accurate time difference can be detected and the accuracy of time difference detection can be improved without exerting influence of the delay caused by signal processing and the delay caused by the transmission of signals.

Further, according to the present invention, the construction machine control method comprises a step of projecting a modulated light as modulated to a predetermined frequency by the laser surveying instrument, a step of detecting a modulated frequency from the modulated light, and of acquiring a time moment when the beam detector receives the laser beam by using the modulated frequency as a time stamp. As a result, in a case where the difference of photodetection time between each of the beam detectors is detected, accurate time difference can be detected and the accuracy of time difference detection can be improved without exerting influence of the delay caused by signal processing and the delay caused by the transmission of signals.

Further, according to the present invention, in the construction machine control method, the laser surveying instrument has electronic distance measuring function, and the modulated light is a distance measuring light. As a result, it is possible to utilize modulation of the distance measuring light and to simplify the arrangement of the devices.

Further, according to the present invention, in the construction machine control method, the modulated frequency for preparing the time stamp is further superimposed on the distance measuring light. As a result, it is possible to cope with the accuracy of the time stamp and to select optimal modulated frequency.

Further, according to the present invention, in the construction machine control method, the laser surveying instrument is installed at a known point, and the laser surveying instrument has distance measuring function and tracking function, and the construction machine control method comprises a step of measuring a predetermined position of the construction machine by the laser surveying instrument, and a step of detecting loci of moving of the construction machine based on a result of position measurement. As a result, tilting of the construction machine can be detected in simple manner without using detecting means such as tilting sensor or the like.

Further, according to the present invention, the construction machine control system comprises a laser surveying instrument for projecting a laser beam in rotary irradiation at constant speed and a construction machine for operating in a photodetection range of the laser beam, and in the construction machine control system, the construction machine comprises a working mechanical unit for carrying out construction operation, a machine control device for controlling the working mechanical unit, and at least three beam detectors which are disposed at known positions with respect to a device reference position of the construction machine and have a photodetector for receiving the laser beam and a direction of the construction machine is calculated based on photodetection timing of each of the beam detectors and the machine control device controls the working mechanical unit so that direction of the construction machine is set to a condition as required based on a result of calculation. As a result, it is possible to detect direction of the construction machine by a laser rotary projecting device and by at least three beam detectors and the cost of facilities is extensively reduced. Also, it is possible to control the operation in wide range where the laser beam can be detected, and the burden of re-installation procedure is considerably decreased.

Further, according to the present invention, in the construction machine control system, the construction machine has a machine communication unit, the laser surveying instrument has a surveying control device and a surveying communication unit, a posture control unit is provided on either one of the construction machine or the laser surveying instrument, one of the at least three beam detectors transmits result of photodetection of the laser beam to the laser surveying instrument or the machine control device and obtains a horizontal angle of each of the beam detectors based on photodetection timing of each of the beam detectors, the posture detecting unit determines direction of the construction machine based on the horizontal angle, and the machine control device controls the working mechanical unit so that direction of the construction machine is set to a condition as required. As a result, it is possible to detect direction of the construction machine by a laser rotary projecting device and by at least three beam detectors and the cost of facilities is extensively reduced. Also, it is possible to control the operation in wide range where the laser beam can be detected, and the burden of re-installation procedure is considerably decreased.

Further, according to the present invention, in the construction machine control system, cross-section of luminous flux of the laser beam is in spot-like shape, the photodetector has a predetermined length in up-and-down direction, and the laser surveying instrument or the machine control device detects height of each of the beam detectors based on the result of photodetection by each of the beam detectors, calculates tilting and tilting direction of the construction machine based on the detected height, and controls the working mechanical unit so that tilting of the construction machine is set to a condition as required based on the result of calculation. As a result, tilting of the construction machine can be detected in simple manner without using detecting means such as tilt sensor or the like, and tilting control of the construction machine becomes easier.

Further, according to the present invention, in the construction machine control system, the laser surveying instrument is installed at a known point, the laser surveying instrument has distance measuring function and tracking function, a target is installed at a known position of the construction machine, and a distance measuring light is projected toward the target, and working position of the construction machine is measured. As a result, working position of the construction machine can be detected at real time and posture control as necessary can be accomplished at the position of construction as required, and loci of construction operation over time of the construction machine can be obtained.

Further, according to the present invention, in the construction machine control system, GPS devices are installed respectively correspond to the beam detectors, time of the moment when the beam detectors receive the laser beam is detected from the GPS device as a time stamp, and horizontal angle of each of the beam detectors is obtained according to the time stamp added to results of photodetection. As a result, in a case where the difference of photodetection time between each of the beam detectors is detected, accurate time difference can be detected and the accuracy of time difference detection can be improved without exerting influence of the delay caused by signal processing and the delay caused by the transmission of signals.

Further, according to the present invention, in the construction machine control system, the laser surveying instrument projects a distance measuring light as modulated, the target has a photodetection element to detect the distance measuring light, the machine control device detects modulated wave from a signal outputted from the photodetection element, the modulated wave is used as a time stamp at a moment when the beam detector detects the laser beam, and horizontal angle of each of the beam detectors is obtained based on the time stamp corresponding to the result of photodetection. As a result, by using modulated frequency of the distance measuring light, the arrangement of the device can be simplified, and in a case where the difference of photodetection time between each of the beam detectors is detected, accurate time difference can be detected and the accuracy of time difference detection can be improved without exerting influence of the delay caused by signal processing and the delay caused by the transmission of signals.

Furthermore, according to the present invention, in the construction machine control system, an error curve is obtained in advance over total circumference with respect to an elevation angle which the beam detectors can detect by detecting the laser beam, and the laser surveying instrument or the machine control device corrects a height thus detected according to the error curve. As a result, the accuracy of height control can be improved.

BRIEF DESCRIPTION OF THE DRAWINGS

FIG. 4 is an explanatory drawing to explain detection of a laser beam by a beam detector and also to explain detection of horizontal angle, FIG. 5A and FIG. 5B are explanatory drawings to explain measurement in direction of a slip-form paving machine by detecting the laser beam by means of a beam detector. FIG. 5A shows a condition where the laser surveying instrument and the slip-form paving machine face directly to each other, and FIG. 5B shows a condition where the slip-form paving machine is rotating.

FIG. 6A shows a position of detection of the laser beam by the beam detector, and FIG. 6B shows an error curve of the elevation angle measured over total circumference.

DETAILED DESCRIPTION OF THE PREFERRED EMBODIMENT

Description will be given below on an embodiment of the present invention by referring to the attached drawings.

Figure 1:
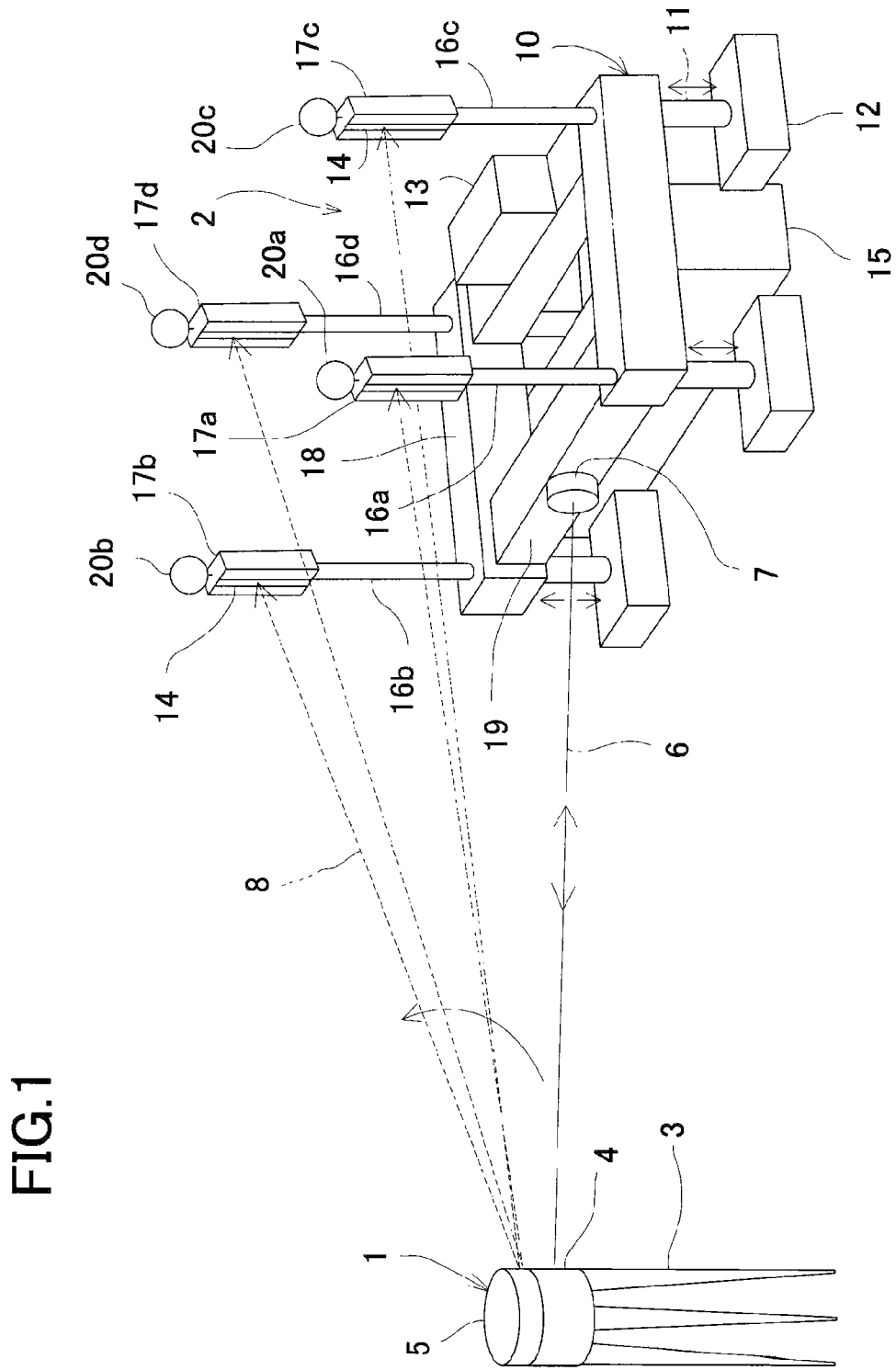
FIG. 1 is a schematical explanatory drawing of a construction machine control system according to an embodiment of the present invention.

First, referring to FIG. 1, description will be given on general features of a construction machine control system according to the embodiment of the present invention, In FIG. 1, reference numeral 1 represents a laser surveying instrument, and reference numeral 2 represents a slip-form paving machine as an example of the construction machine.

The laser surveying instrument 1 is installed at a known point via a tripod 3. The laser surveying instrument 1 comprises an electronic distance measuring instrument 4 which has a tracking function of a target, a laser rotary projecting unit 5 integrally provided with the electronic distance measuring instrument 4, and a surveying communication unit 23 (to be described later) to perform wireless communication to and from a machine control device 13 (to be described later) on a side of the slip-form paving machine 2.

The electronic distance measuring instrument 4 has functions similar to the functions of a total station, projects a distance measuring light 6 toward a target 7, performs distance measurement and angle measurement by detecting a reflection light from the target 7, and tracks the target 7 based on the reflection light from the target 7. The laser rotary projecting device 5 projects laser beams 8 with cross-section of light beam in spot-like shape, and projects the laser beam in rotary irradiation at constant speed. When the laser beams 8 are projected in rotary irradiation, a reference plane is formed. For instance, a horizontal reference plane is formed when the laser beams 8 are projected in horizontal direction.

A range of construction operation is set up so that the slip-form paving machine 2 will be operated within photodetection range of the laser beams 8. The slip-form paving machine 2 comprises a machine body frame 10 designed in rectangular form, a running device 12 installed at each of four corners of the machine body frame 10 respectively, each being disposed via a leg unit 11 expansible and contractible in up-and-down direction, and a machine control device 13 installed on the machine body frame 10.

As each of the running devices 12, a crawler running device is used, for instance. Running operation of each of the running devices 12 can be individually controlled by the machine control device 13.

On a lower surface of the center of the machine body frame 10, a screed 15 is disposed. The screed 15 carries out a series of process with high accuracy for storing the mixed and kneaded concrete slabs and further, for compacting and molding while placing the concrete slabs. Height of the screed 15, i.e. height of concrete placing surface, is primarily controlled by properly controlling expansion and contraction of the leg units 11. The screed 15 and the running device 12 fulfill the functions as a working mechanical unit of the slip-form paving machine 2, and the working mechanical unit is controlled by the machine control device 13.

At the positions as required on the machine body frame 10—preferably at four corners of the machine body frame 10, or more preferably at four corners of a rectangle, pillars 16a, 16b, 16c and 16d are erected respectively, and on upper end of each of the pillars 16a, 16b, 16c and 16d, beam detectors 17a, 17b, 17c and 17d are installed respectively.

Each of the beam detectors 17a, 17b, 17c and 17d has a photodetection sensor 14 for detecting the laser beams 8 respectively. The photodetection sensor 14 is extended in up-and-down direction and has a predetermined length. The photodetection sensor 14 is a sensor where pixels are aligned in form of a straight line, e.g. a line sensor. When the laser beams 8 pass through, it is so designed that the photodetection sensor 14 detects the laser beams 8 and can detect photodetecting position. Therefore, it is so designed that the photodetection sensor 14 produces a light detection signal and a signal of photodetecting position as photodetection signals.

Each of the beam detectors 17a, 17b, 17c and 17d has a communication unit 39 for detector (to be desired later). The communication unit 39 for detector performs wireless communication and sends photodetection signals as emitted from the photodetection sensors 14 to the laser surveying instrument 1 respectively, and/or sends the photodetection signal to the machine control device 13. Each of the beam detectors 17a, 17b, 17c and 17d may be connected with the machine control device 13 via cable, and the photodetection signal emitted from the photodetection sensor 14 may be sent to the machine control device 13 via wired communication.

Each of GPS devices 20a, 20b, 20c and 20d is integrally mounted on each of the beam detectors 17a, 17b, 17c and 17d respectively, or is disposed at a position nearby respectively. The GPS devices 20a, 20b, 20c and 20d acquire standard time according to signals from the satellite.

Height of each of the beam detectors 17a, 17b, 17c and 17d (i.e. a height of standard position of the photodetection sensor 14, for instance, position of the center in up-and-down direction of the photodetection sensor 14) is to be at the same height when the slip-form paving machine 2 is at horizontal position and height of the reference position and position within horizontal plane of each of each photodetection sensor 14 (e.g. the center of installation of the screed 15) are with respect to the device standard position of the slip-form paving machine 2. That is, the position of three-dimensional data of the reference position of the photodetection sensor 14 with respect to the device reference position is already known.

In the beam detectors 17a, 17b, 17c and 17d, a straight line for connecting two beam detectors 17a and 17b on front side (i.e. a straight line connecting the reference position of the two photodetection sensors 14 and 14) and a straight line connecting the beam detectors 17c and 17d on rear side (i.e. a straight line connecting the reference position of the two photodetection sensors 14 and 14) are set in such manner that these straight lines perpendicularly cross the advancing direction of the slip-form paving machine 2 respectively.

In the beam detectors 17a, 17b, 17c and 17d, a straight line connecting two beam detectors 17a and 17c on one side (i.e. a straight line connecting the reference positions of two photodetection sensors 14 and 14) and a straight line connecting two beam detectors 17b and 17d on the other side (i.e. a straight line connecting reference positions of the photodetection sensors 14 and 14) as set in parallel to the advancing direction of the slip-form paving machine 2. Further, distances between the beam detectors 17a, 17b, 17c and 17d are measured in advance and are already known.

The machine body frame 10 comprises two longitudinal beams 18 extended in parallel to the advancing direction and two lateral beams 19 perpendicularly crossing the longitudinal beams 18, and the lateral beams 19 are extended or contracted according to the condition of construction operation. Also, the distance between the beam detectors 17a, 17b, 17c and 17d from each other is already known under the condition of expansion and contraction respectively.

On front surface of the machine body frame 10 (the lateral beam 19 in the figure), the target 7 is disposed. As the target, for instance, a reflection prism is used, and the target is provided at a known position with respect to the device standard position of the slip-form paving machine 2. By measuring a position (three-dimensional position) of the target 7 by the laser surveying instrument 1 and by identifying direction (or posture) of the slip-form paving machine 2 (to be described later), device standard position of the slip-form paving machine 2 can be measured.

The laser surveying instrument 1 has the surveying communication unit 23, and receives result of photodetection from the beam detectors 17. Then, based on the results thus received, horizontal angle and elevation angle can be determined by taking the laser surveying instrument 1 as reference at the moment when the laser beams are received by the beam detectors 17a, 17b, 17c and 17d. Further, direction (or posture), tilting and position of the slip-form paving machine 2 can be determined according to the results of position measurement of the target 7 and according to the results of measurement of the horizontal angle and the elevation angle. Then, the results of the measurement are sent to the machine control device 13 via the surveying communication unit 23.

From each of the GPS devices 20a, 20b, 20c and 20d corresponding to each of the beam detectors 17a, 17b, 17c and 17d, the time when each of the beam detectors 17a, 17b, 17c and 17d detects the light is acquired, and the results are associated with each of the photodetection signals. That is, the time obtained by each of the GPS devices 20a, 20b, 20c and 20d is used as a time stamp of the photodetection signal. By transmitting the photodetection signal with the time stamp to the laser surveying instrument 1, the laser surveying instrument 1 can accurately detect the time when each of the beam detectors 17a, 17b, 17c and 17d receives the laser beams 8.

Therefore, it is possible to avoid time lag caused by signal processing when the photodetection signal is sent via wireless communication from each of the beam detectors 17a, 17b, 17c and 17d to the laser surveying instrument 1, and also, to avoid time lag of transmission caused by distance.

In a case where the time lag associated with wireless transmission can be neglected, e.g. in a case where the laser surveying instrument 1 and the beam detector 17 are at a distance closer to each other or the like, the time stamp from the GPS devices 20a, 20b, 20c and 20d may not be necessary to acquire, or the GPS devices 20a, 20b, 20c and 20d themselves may not be used.

The laser surveying instrument 1 transmits position information such as the horizontal angle and the elevation angle measured and the position or the like of the slip-form paving machine 2 to the machine control device 13 via the surveying communication unit 23 (not shown). Then, the machine control device 13 controls the leg units 11, the running devices 12, the screed 15, etc. based on the position information as received at timing as required and to condition as required.

Figure 2:
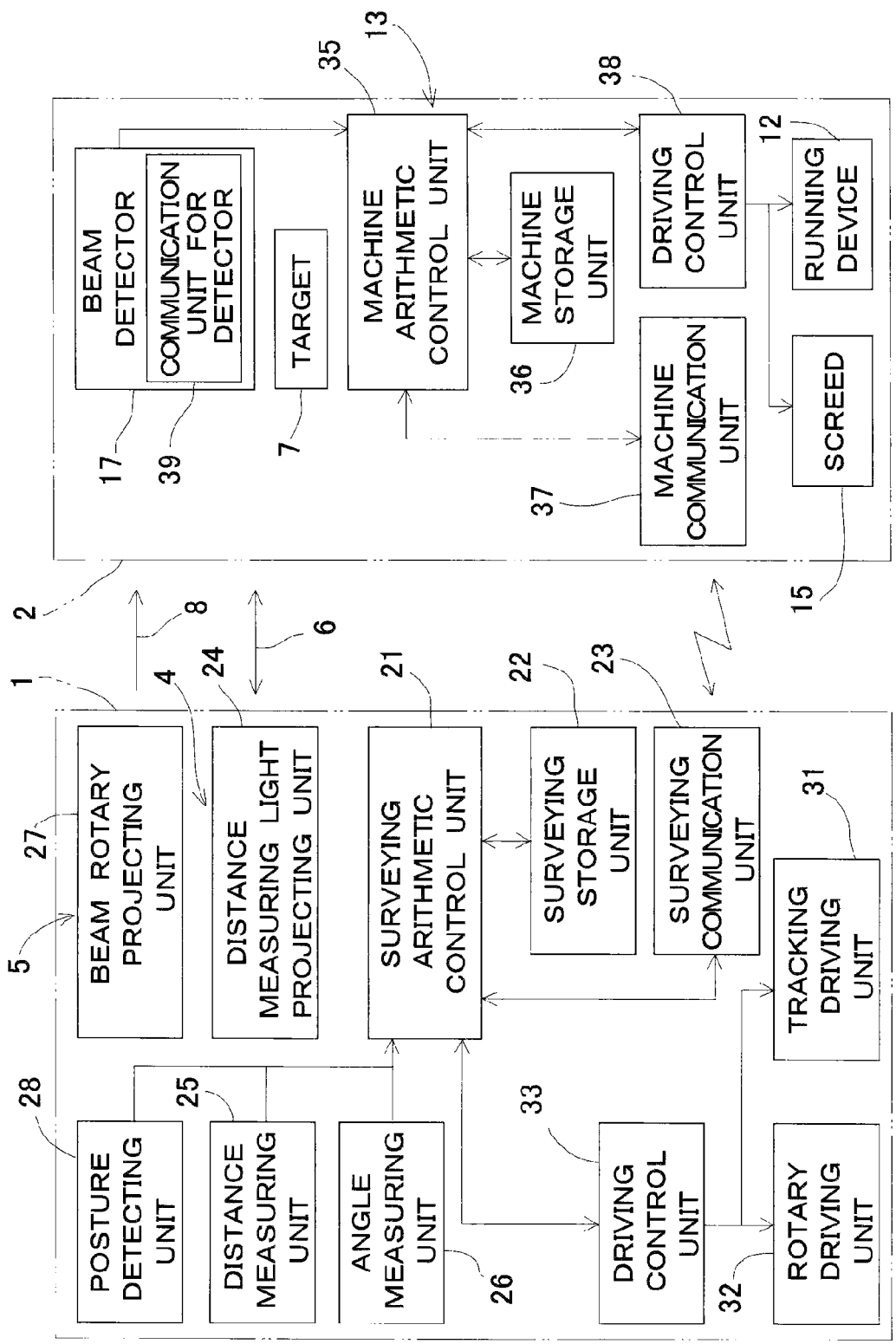
FIG. 2 is a schematical block diagram of the construction machine control system.

Next, referring to FIG. 2, description will be given below on approximate arrangement of the construction machine control system.

The laser surveying instrument 1 comprises the electronic distance measuring instrument 4, and the laser rotary projecting device 5. Further, the laser surveying instrument 1 has a surveying arithmetic control unit 21, a surveying storage unit 22, the surveying communication unit 23, a distance measuring light projecting unit 24, a distance measuring unit 25, an angle measuring unit 26, a beam rotary projecting unit 27, a posture detecting unit 28, a tracking driving unit 31, a rotary driving unit 32, and a driving control unit 33.

The surveying arithmetic control unit 21 carries out coordinated control the electronic distance measuring instrument 4 and the laser rotary projecting device 5. In the surveying storage unit 22, various types of programs are stored. These programs include: a program needed for the coordinated control, a program necessary for executing distance measurement and tracking by the electronic distance measuring instrument 4, a program, etc necessary for carrying out rotary projection of the laser beams 8 at constant speed by the laser rotary projecting device 5 and for measuring horizontal angle and elevation angle based on photodetection signals from the beam detectors 17a, 17b, 17c and 17d, and other types of programs.

The distance measuring light projecting unit 24 projects the distance measuring light 6 and measures a distance to the target 7 by detecting a reflected distance measuring light reflected by the target 7. The angle measuring unit 26 detects an angle in projecting direction of the laser beams 8 at the moment when the distance measuring light projecting unit 24 receives the reflected distance measuring light, and measures elevation angle and horizontal angle of the target 7.

The beam rotary projecting unit 27 projects the laser beams 8 having a luminous flux cross-section in spot-like shape in horizontal direction and rotates the laser beam at constant speed, and the beam rotary projecting unit 27 has a horizontal angle detector (not shown) for detecting projecting direction (horizontal angle) of the laser beams 8.

The posture detecting unit 28 detects elevation angle and horizontal angle of each of the beam detectors 17a, 17b, 17c and 17d based on photodetection signals transmitted from each of the beam detectors 17a, 17b, 17c and 17d. Further, direction and tilting of the slip-form paving machine 2 are calculated according to the elevation angle and the horizontal angle thus detected. With regard to the direction and the tilting of the slip-form paving machine 2, it may be so arranged that the elevation angle and the horizontal angle detected are transmitted to the machine control device 13 and direction and tilting of the slip-form paving machine 2 may be calculated at the machine control device 13. Also, the posture detecting unit 28 is mounted on the machine control device 13 and direction and tilting of the slip-form paving machine 2 may be calculated at the machine control device 13 according to the elevation angle and the horizontal angle transmitted from the surveying communication unit 23.

The tracking driving unit 31 projects a tracking light to the target 7, and tracks the target 7 based on the reflection light from the target 7, and the rotary driving unit 32 projects the laser beams 8 in rotary irradiation at constant speed. Driving of the tracking driving unit 31 and driving of the rotary driving unit 32 are controlled by the driving control unit 33, and the surveying arithmetic control unit 21 issues control command necessary for controlling the driving to the driving control unit 33.

In this case, the distance measuring light projecting unit 24, the distance measuring unit 25, the angle measuring unit 26, the tracking driving unit 31, etc. make up together a principal part of the electronic distance measuring instrument 4, and the beam rotary projecting unit 27, the posture detecting unit 28, the rotary driving unit 32, etc. make up together a principal part of the laser rotary projecting device 5.

The slip-form paving machine 2 comprises a machine arithmetic control unit 35 for carrying out a series of processes as given above to the screed 15, a machine storage unit 36 where the programs necessary for executing the series of processes are stored, a machine communication unit 37 for performing communication on control information or the like to and from the surveying communication unit 23, and a driving control unit 38 for controlling the driving of the running devices 12 and the screed 15. The machine control device 13 comprises the machine arithmetic control unit 35, the machine storage unit 36, the machine communication unit 37, the driving control unit 38, etc.

The slip-form paving machine 2 has the beam detectors 17a, 17b, 17c and 17d. Further, each of the beam detectors 17a, 17b, 17c and 17d has the communication unit 39 for detector.

When the laser beams 8 pass through each of the beam detectors 17, each of the beam detectors 17 detects the laser beams 8, and the time of detection is acquired by the GPS device 20. A time stamp is put on the photodetection signals detected at the beam detectors 17 and the photodetection signals are sent to the laser surveying instrument 1 by the communication unit 39 for detector via wireless communication, and/or the photodetection signals are sent to the machine arithmetic control unit 35. To the wireless signals issued from the communication unit 39 for detector, identification signals, each corresponds to the beam detectors 17a, 17b, 17c and 17d respectively, may be added for differentiating purposes.

Figure 3:
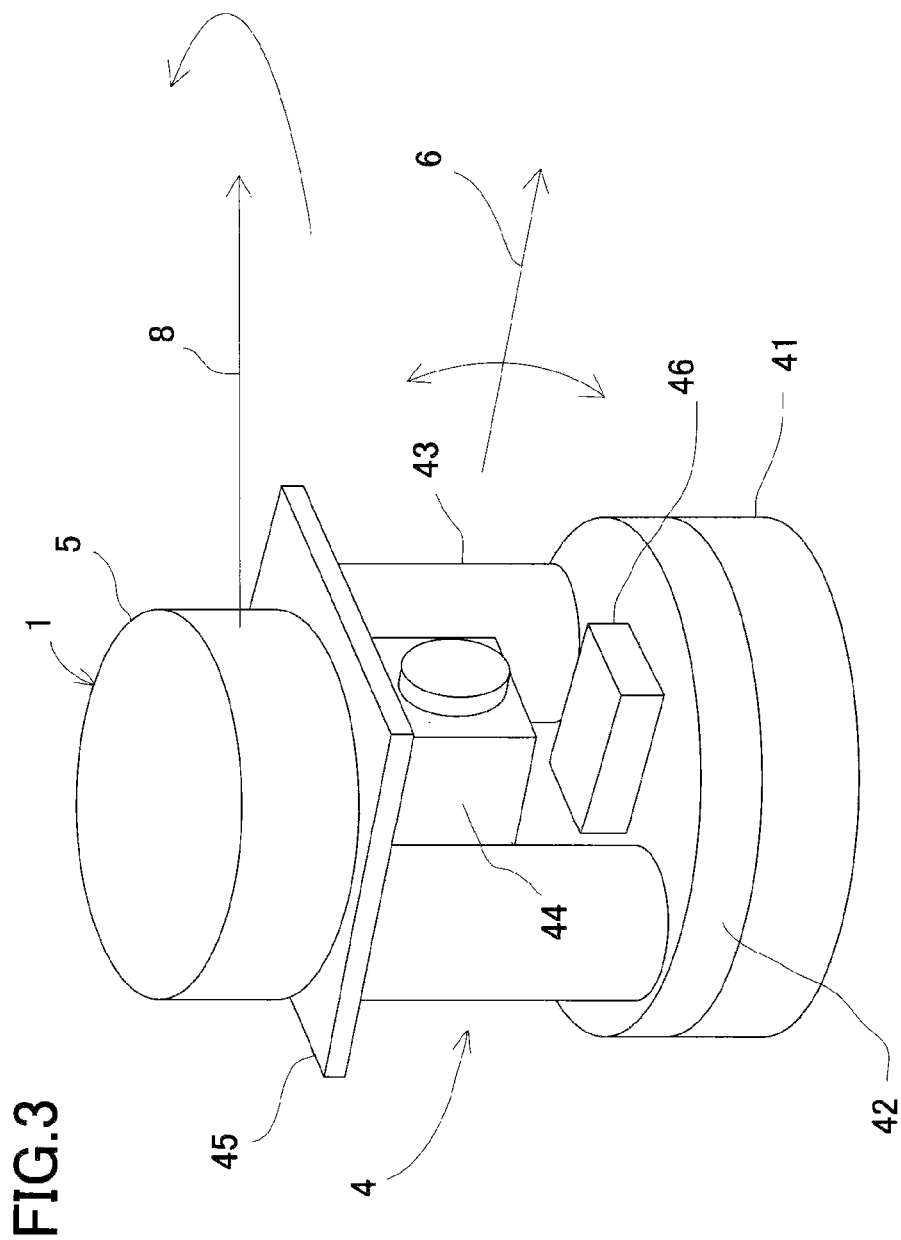
FIG. 3 is a schematical perspective view of a laser surveying instrument to be used in the construction machine control system.

Next, referring to FIG. 3, description will be given further on the laser surveying instrument 1. In FIG. 3, the tripod 3 is not shown for the purpose of facilitating the explanation.

The laser surveying instrument 1 has a leveling unit 41. The electronic distance measuring instrument 4 and the laser rotary projecting device 5 are provided on the leveling unit 41.

The leveling unit 41 performs leveling of the electronic distance measuring instrument 4 via a rotary base plate 42, and the leveling unit 41 has a horizontal rotation driving unit (not shown) incorporated in the leveling unit 41 and can rotate the rotary base plate 42 in horizontal direction.

A supporting unit 43 is erected on the rotary base plate 42. A telescope unit 44 is rotatably supported in vertical direction on the supporting unit 43, and it is so arranged that the telescope unit 44 is rotated in vertical direction by a vertical rotary driving unit (not shown). A distance measuring optical system, a tracking optical system, and the distance measuring unit 25 are accommodated in the telescope unit 44. The distance measuring light 6 and a tracking light (not shown) are projected from the telescope unit 44. Then, the reflected distance measuring light from the target 7 is received and distance is measured, and the tracking light reflected by the target 7 is received via the tracking optical system, and tracking is carried out. The horizontal rotary driving unit (not shown) and the vertical rotary driving unit (not shown) rotate the telescope unit 44 in horizontal direction and in vertical direction for the purpose of tracking.

A horizontal angle detector (not shown) is disposed on the leveling unit 41 and a vertical angle detector is disposed on the supporting unit 43, and horizontal angle and vertical angle in a sighting direction (i.e. projecting direction of the distance measuring light 6) of the telescope unit 44 can be measured by the horizontal angle detector and the vertical angle detector respectively. Therefore, the electronic distance measuring instrument 4 fulfills the function as a total station having tracking function.

A top plate 45 is mounted on an upper end of the supporting unit 43, and the laser rotary projecting device 5 is disposed on the top plate 45. A surveying control device 46 is installed at such position as required on the laser surveying instrument 1, e.g. on the rotary base plate 42. The surveying control device 46 is made up together by the surveying arithmetic control unit 21, the surveying storage unit 22, the surveying communication unit 23, the distance measuring unit 25, the angle measuring unit 26, the posture detecting unit 28, the driving control unit 33, etc.

Next, referring to FIG. 4 and FIG. 5, description will be given on operation of the present embodiment.

To facilitate the explanation, description will be given below on a case where two of the beam detectors 17a and 17b detect the laser beams 8 by referring to FIG. 4. A distance between the beam detectors 17a and 17b is supposed to be A meters (e.g. 10 meters). The target 7 is installed on the midway between the beam detectors 17a and 17b.

In FIG. 4, a line R indicates reference direction as set up on the laser surveying instrument 1. The laser surveying instrument 1 can measure a projecting direction of the distance measuring light 6 and a projecting direction of the laser beams 8 by using the line R as reference.

The electronic distance measuring instrument 4 performs sighting on the target 7. A distance D to the target 7 is measured, and a horizontal angle α of the target 7 is measured.

By rotary projection of the laser beams 8, the beam detectors 17a and 17b detect the laser beams 8. At the moment when the beam detectors 17a and 17b detect the laser beams 8, respective time moments of detection are acquired by the GPS devices 20a and 20b. Detection time is put to the detection signal as a time stamp. As the result of detection, the detection signals are transmitted to the laser surveying instrument 1 respectively from the communication unit 39 for detector of the beam detectors 17a and 17b.

The laser surveying instrument 1 receives the result of the detection via the surveying communication unit 23. Further, by the time stamp included in the results of detection, the posture detecting unit 28 detects projecting direction of the laser beams 8 at each of the moments when the beam detectors 17a and 17b detect the laser beams 8. Projecting direction of the laser beams 8 is detected as a horizontal angle α1 and a horizontal angle α2 in directions of the beam detectors 17a and 17b respectively. Further, horizontal angles θ1 and θ2 of the beam detectors 17a and 17b with respect to the sighting direction of the target 7 can be calculated based on the horizontal angle α and horizontal angles α1 and α2.

Based on the result of photodetection of the laser beams 8 from the beam detectors 17a and 17b, position in elevation of each of the beam detectors 17a and 17b can be detected. That is, it can be identified from which of pixels of the photodetection sensor 14 the detection signal has been outputted, and according to the position of pixel, which outputs the signal, it can be detected how far the reference position of the photodetection sensor 14 is distant from the horizontal reference plane in upward or downward direction from the horizontal reference plane.

Similarly, horizontal angle and position in elevation can be determined on the beam detectors 17c and 17d on rear side. By determining all of the horizontal angle of the beam detectors 17a, 17b, 17c and 17d, direction of the slip-form paving machine 2 can be determined. Also, by detecting the all of position in elevation of the beam detectors 17a, 17b, 17c and 17d, tilting and tilting direction of the slip-form paving machine 2 can be determined.

Now, by referring to FIG. 5, further description will be given below about measurement of direction of the slip-form paving machine 2. In the figure, it is supposed that each of the beam detectors 17a, 17b, 17c and 17d is disposed at a vertex of a square respectively, and that length of a side of the square is S.

FIG. 5A shows a condition where the slip-form paving machine 2 faces directly to the laser surveying instrument 1. Horizontal angles θ1 and θ2 of the beam detectors 17a and 17b in relation to the optical axis of the measuring light 6 (i.e. the sighting direction of the target 7 by the electronic distance measuring instrument 4) is in a relation of θ1=θ2, and horizontal angles θ1' and θ2' of the beam detectors 17c and 17d are in a relation of: θ1'=θ2'. Therefore, a difference of the horizontal angles between the beam detectors 17a and 17d, i.e. θ1−θ1'=Δθ1 is equal to θ2−θ2'=Δθ2. That is, (Δθ1=Δθ2)

However, in a case where the direction of the slip-form paving machine 2 is changed by an angle β (i.e. the slip-form paving machine 2 is rotated at an angle of β in counterclockwise direction), the relation between the horizontal angles θ1 and θ2 of the beam detectors 17a and 17b is in a relation of θ1=θ2. However, horizontal angles of the beam detectors 17c and 17d (i.e. θ1' and θ2') are not equal to each other. As shown in the figure, θ1' and θ2' are in a relation of: θ1'<θ2'.

Further, if the horizontal angles of the beam detectors 17c and 17d are in a relation of: $\theta_1' \neq \theta_2'$, then, $\Delta\theta_1 \neq \Delta\theta_2$ (in the figure, $\Delta\theta_1 > \Delta\theta_2$).

Δθ1 can be calculated according to the following equations:

$$\theta 1 = \tan^{-1}(S/2D)$$

$$\theta 1' = \tan^{-1}(S/2(2(D+S)))$$

$$\Delta\theta 1 = \theta 1 - \theta 1' = [\tan^{-1}(S/2D)] - [\tan^{-1}(S/2(2(D+S)))]$$

Also, Δθ2 can be calculated in similar manner.

Therefore, by calculating the change of the value Δθ1, an angle β of directional change of the slip-form paving machine 2 can be determined. As a result, it is possible to determine the direction of the slip-form paving machine 2.

Because the position in elevation of each of the beam detectors 17a, 17b, 17c and 17d can be determined, tilting amount and tilting direction of the slip-form paving machine 2 can be calculated based on the result of measurement with respect to the target 7, based on positions of the beam detectors 17a, 17b, 17c and 17d and based on distance between the beam detectors 17a, 17b, 17c and 17d. Thereby, the posture of the slip-form paving machine 2 including direction, tilting amount, and tilting direction can be determined.

Because the laser surveying instrument 1 is installed at a known point, by measuring a distance to the target 7 and by determining direction and elevation angle of the target 7, three-dimensional position (i.e. absolute coordinates in ground surface system) of the slip-form paving machine 2 can be obtained, too.

The laser surveying instrument 1 transmits posture information and positional information of the slip-form paving machine 2 measured to the slip-form paving machine 2 via the surveying communication unit 23. The transmitted information is received by the machine communication unit 37 and further, is inputted to the machine control device 13 via the machine communication unit 37. Based on the posture information and the positional information inputted, the machine control device 13 carries out paving operation by controlling the running device 12 and the screed 15.

Figure 6A:
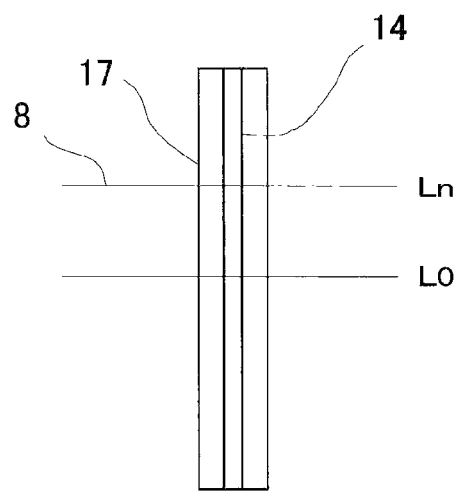
FIG. 6A and FIG. 6B are explanatory drawings to show detecting position of the laser beam of the beam detector and an error regarding total circumference of elevation angle measured at the detecting position.

Next, referring to FIG. 6, description will be given on correction of the horizontal angle detected by the beam detector 17.

When the beam rotary projecting unit 27 (see FIG. 2) projects the laser beams 8 by rotary irradiation, the laser beam is projected in rotary irradiation by changing the intensity of the light or by changing the form of the light, depending on de-centering of rotation axis (deviation of optical axis) of the beam rotary projecting unit 27, and depending on beam profile (cross-sectional form of the beam, irregularity of intensity, etc.) and by unsteadiness. Detection of a crossing position in elevation by the beam detector 17 is obtained by the position of transmission of the laser beams 8. Therefore, when the laser beams are projected in rotary irradiation while changing the intensity or while changing the form of the laser beam, the detection of the position in elevation appears as an error of the detected elevation angle.

Figure 6B:
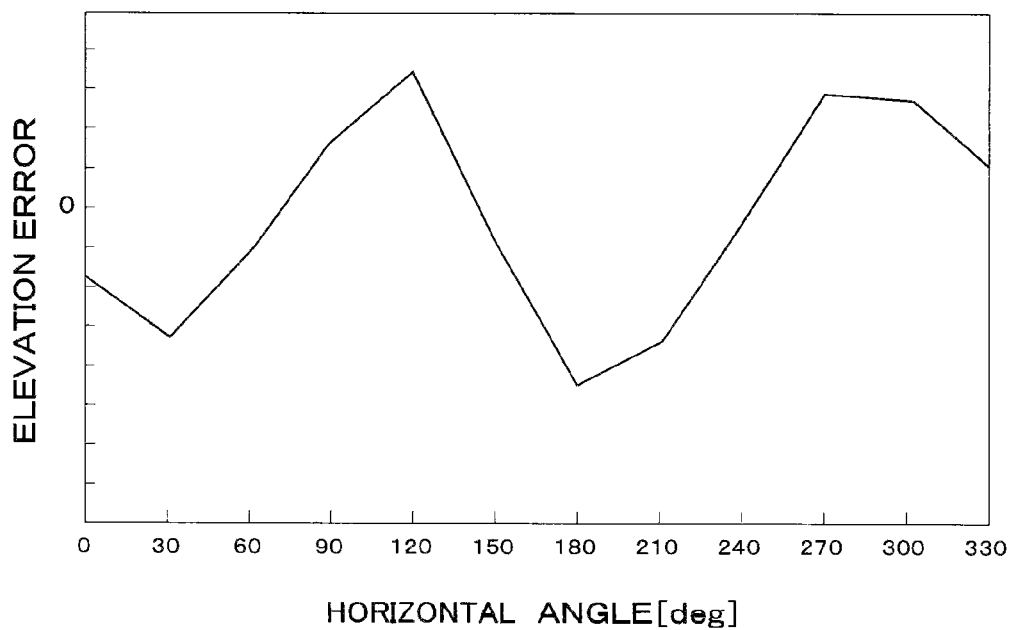

The error of the position in elevation detected when the laser beam 8 crosses Ln (see FIG. 6A) of the beam detector 17 is shown as an error curve in FIG. 6B. As the method of measurement, the beam detectors 17 are disposed over circumference with the laser rotary projecting device 5 at the center and with angular pitch as required (e.g. at a pitch of 30°), and the position in elevation is detected at each of the positions.

In the figure, it is shown that two sine curves are included, and two or more causes of error are included. The reproducibility of the error curve is high, and the same error appears in the same direction. Therefore, by acquiring the error curve in advance, the position in elevation as detected can be corrected according to the error curve, and by this correction, it is possible to determine the position in elevation with higher accuracy.

In the embodiment as given above, description is given on the slip-form paving machine 2, while it is needless to say that the embodiment can be carried out on posture control of other types of construction machine. In the embodiment as given above, the beam detectors 17 are disposed at each of four vertexes of a rectangle respectively, but there is no limitation on the position if the beam detectors are disposed on the positions already known. Further, in the embodiment as given above, two beam detectors 17 are installed at forward position and two beam detectors 17 are disposed at rear positions, while it may be so arranged that two beam detectors 17 are disposed at forward positions and one beam detector 17 is disposed at rear position. Further, in a case where only the posture control of the construction machine is concerned, the electronic distance measuring instrument 4 and the target 7 may not be used.

In the embodiment as given above, cross-section of the luminous fluxes of the laser beam 8 projected in rotary irradiation is designed in spot-like shape, and a sensor, which is long in up-and-down direction, is used as the photodetection unit. However, a laser beam having one or more fan beams with cross-section of luminous flux longer in up-and-down direction may be used as the laser beam (at least one fan beam runs in vertical direction), and the sensor of the photodetection unit may be designed in spot-like shape.

Also, it may be so designed that a reflection member (such as reflection plate, retroreflective prism, etc.) may be installed on the same axis as the photodetection unit of the beam detector 17, and the horizontal angle and elevation angle of the beam detector 17 with respect to the laser surveying instrument 1 are calculated by detecting the reflected light on the laser surveying instrument 1 side.

In the embodiment as given above, a signal is acquired as the time stamp from the GPS devices 20a, 20b, 20c and 20d as installed to correspond to the beam detectors 17a, 17b, 17c and 17d respectively, while the signal as the time stamp can be obtained by other method.

For instance, as the means to acquire the time stamp, the GPS device may be installed on one of the beam detectors 17a, 17b, 17c and 17d, or the GPS device installed at a position as required on the machine body frame 10 may be used.

Brief description will be given below by referring to FIG. 1 and FIG. 2.

The photodetection signal obtained when each of the beam detectors 17a, 17b, 17c and 17d detects the laser beam 8 are sent to the machine arithmetic control unit 35. Then, the machine arithmetic control unit 35 acquires the time at the moment when the beam detectors 17a, 17b, 17c and 17d detect the laser beam 8 from the GPS device. The machine arithmetic control unit 35 puts the time stamp to each of the photodetection signals of the beam detectors 17a, 17b, 17c and 17d, and the signals are transmitted to the laser surveying instrument 1 via the machine communication unit 37.

On the laser surveying instrument 1, the rotation angle at the moment of photodetection is measured from the angle measuring unit 26 for each photodetection signal based on the photodetection signal received via the surveying communication unit 23. Also, based on the time moment obtained by the time stamp, rotation angle (i.e. relative rotation angle between the photodetection signals) can be accurately determined.

The rotation angle thus determined is transmitted to the machine control device 13 via the surveying communication unit 23.

In this case, it may be so arranged that, when the photodetection signals are transmitted from the beam detectors 17a, 17b, 17c and 17d, to the machine control device 13, length of electrical transmission route between each of the beam detectors 17a, 17b, 17c and 17d and the machine control device 13 may be identical or the like to each other so that no difference of transmission time may occur between each of the photodetection signals. By eliminating the difference of the transmission time, photodetection timing of the beam detectors 17a, 17b, 17c and 17d can be accurately reflected on the time stamp.

Figure 7:
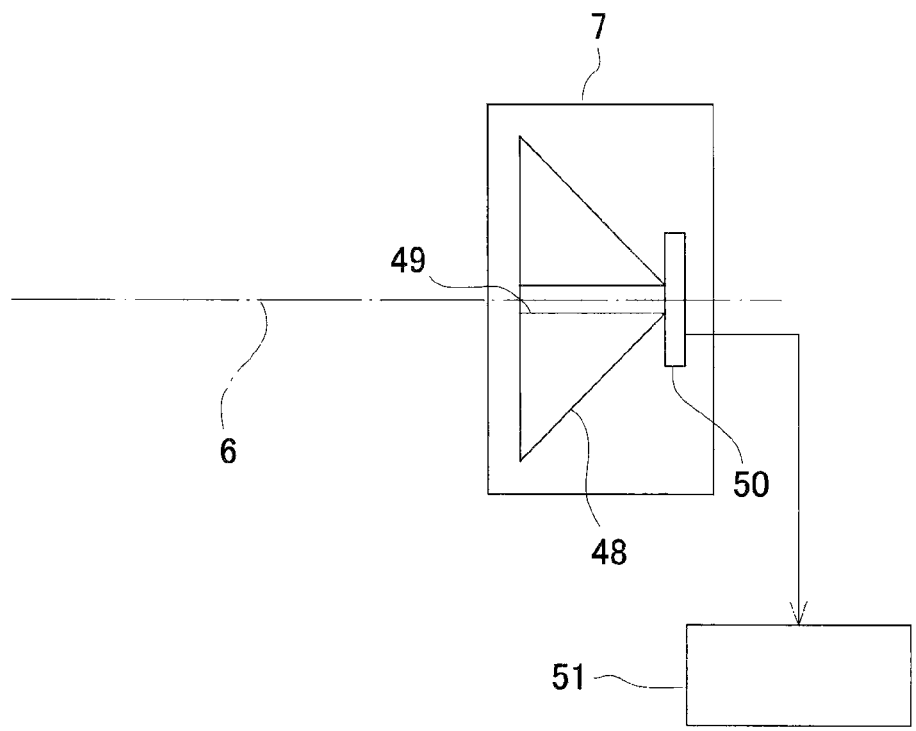
FIG. 7 is an explanatory drawing of a target as means for acquiring a time stamp.

Referring to FIG. 7, description will be given below on still another example of the means to acquire the time stamp.

FIG. 7 shows the target 7 to be installed on front surface of the machine body frame 10.

The target 7 has a prism 48 incorporated inside, and the distance measuring light 6 is reflected to the laser surveying instrument 1 by the prism 48. A hole 49 is formed to penetrate the central portion of the prism 48, and a photodetection element 50 is provided at one end (i.e. at an end closer to the center of the machine body frame 10) of the hole 49. A part of the distance measuring light 6 as emitted from the laser surveying instrument 1 passes through the hole 49 and is received by the photodetection element 50.

A signal processing unit 51 is electrically connected to the photodetection element 50. The signal processing unit 51 performs signal processing such as amplification or the like on the photodetection signal from the photodetection element 50, and the signal is outputted.

The distance measuring light 6 is accurately modulated by the distance measuring light projecting unit 24 so as to have a predetermined modulated frequency. It is so designed that the signal processing unit 51 detects the modulated frequency from the photodetection signal of the distance measuring light (hereinafter, referred as "distance measuring light photodetection signal"), and outputs the signal to the machine control device 13. The modulated frequency is used for the preparation of the time stamp.

As the modulated frequency for the preparation of the time stamp, the modulated frequency as modulated for the measurement of the distance measuring light 6 may be used. Or, for the preparation of the time stamp, the modulated frequency may be modulated at a frequency different from the modulation for the measurement, and the modulated frequency may be superimposed on the distance measuring light 6.

Each of the beam detectors 17a, 17b, 17c and 17d detects the laser beam 8 puts an identification signal to each of the photodetection signals detected, and outputs as a photodetection signal with an identification signal. The photodetection signals from the beam detectors 17a, 17b, 17c and 17d are inputted to the machine arithmetic control unit 35. The modulated frequency signal is inputted to the machine arithmetic control unit 35 from the signal processing unit 51.

The machine arithmetic control unit 35 acquires a phase of the modulated frequency signal at the moment when each of the beam detectors 17a, 17b, 17c and 17d detects the laser beam 8.

The machine arithmetic control unit 35 puts the phase acquired as the time stamp to the photodetection signal of each of the beam detectors 17a, 17b, 17c and 17d, and transmits the photodetection signal to the laser surveying instrument 1 via the machine communication unit 37. Or, the machine arithmetic control unit 35 puts a time stamp, in which the phase is converted to time, to the photodetection signal, and transmits the photodetection signal.

At the laser surveying instrument 1, a rotation angle at the moment of photodetection is measured by the angle measuring unit 26 for each photodetection signal based on the photodetection signal received from the surveying communication unit 23. And by comparing the time stamp of each photodetection signal with each other, more accurate photodetection timing (time of photodetection) can be acquired.

Thus, by comparing the time of photodetection, time difference of photodetection time between each photodetection signal can be accurately measured, and based on the time difference thus measured, rotation angle (relative rotation angle between each of the photodetection signals) can be accurately determined.

In this case, too, it may be so arranged that, when the photodetection signals are transmitted from the beam detectors 17a, 17b, 17c and 17d to the machine control device 13, the length of electrical transmission route between each of the beam detectors 17a, 17b, 17c and 17d and the machine control device 13 may be identical or the like to the length of transmission time occurs between the photodetection signals.

In the description as given above, the modulated frequency is superimposed on the distance measuring light 6, while it may so arranged that the laser surveying instrument 1 projects a light accurately modulated separately and that the photodetection element 50 is disposed separately from the target 7.

Figure 8:
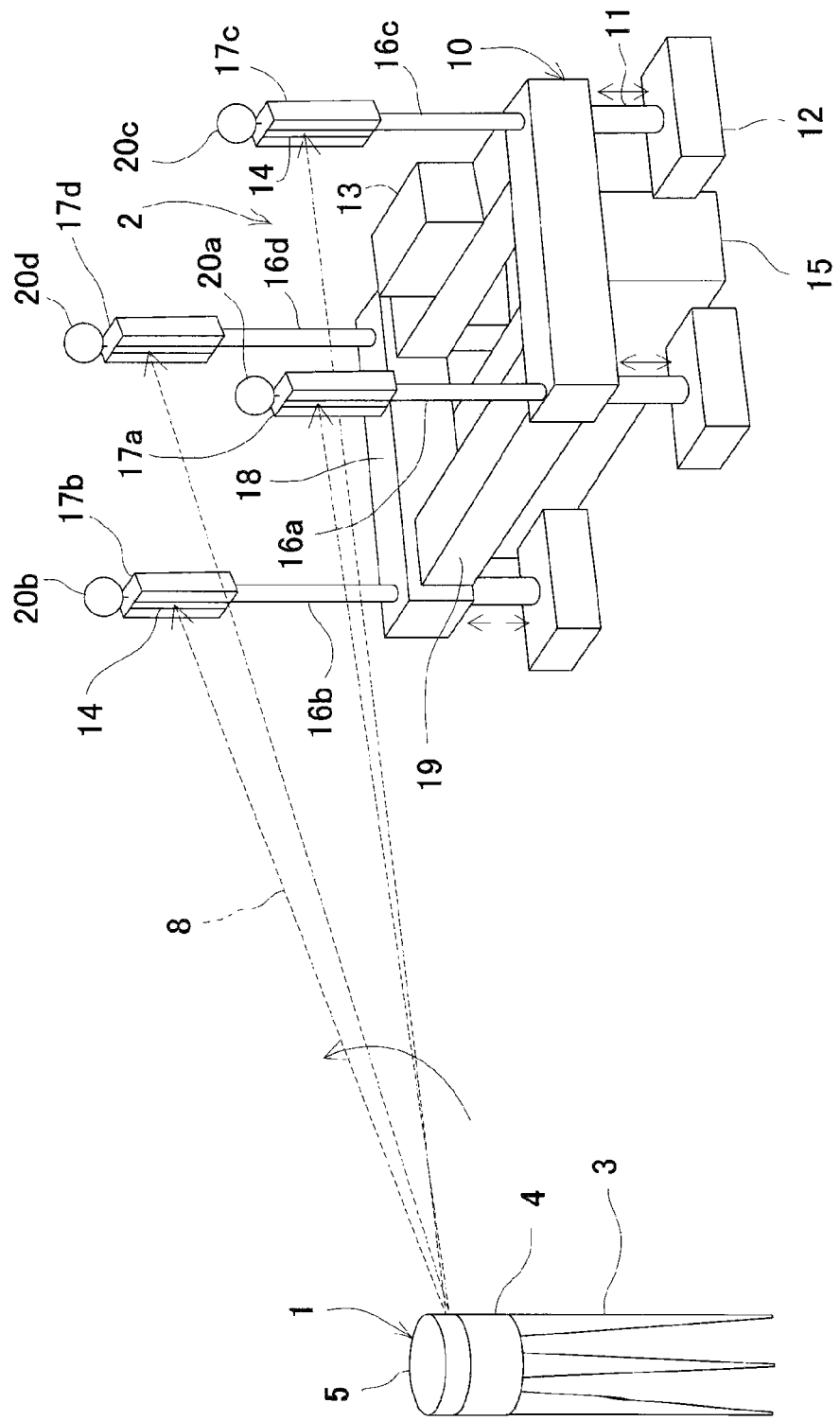
FIG. 8 is a schematical explanatory drawing of a control system of a construction machine according to a second embodiment.
Figure 9:
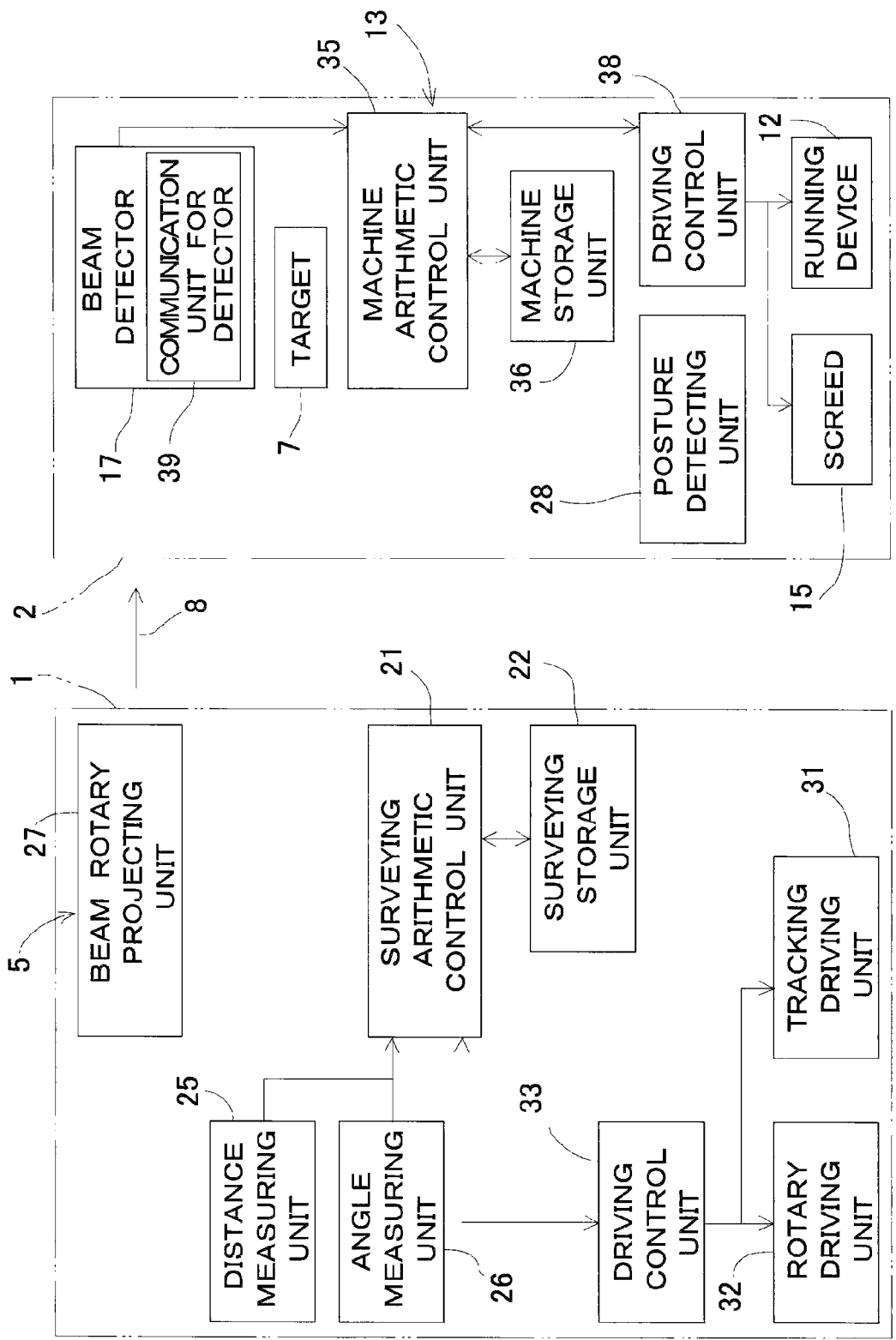
FIG. 9 is a schematical block diagram of a construction machine control system.

Referring to FIG. 8 and FIG. 9, description will be given now on a second embodiment.

In the second embodiment, distance measurement function and angle measurement function of a laser surveying instrument 1 are omitted. Also, a surveying communication unit 23 of the laser surveying instrument 1 and a machine communication unit 37 of a slip-form paving machine 2 are omitted. In FIG. 8 and FIG. 9, the same component as shown in FIG. 1 and FIG. 2 is referred by the same symbol, and detailed description is not given. In a case where of the second embodiment, a posture detection unit 28 is installed on a side of the slip-form paving machine 2. Or, a machine arithmetic control unit 35 may have the function of the posture detecting unit 28.

The laser surveying instrument 1 projects a laser beam 8 having spot like cross-section of luminous flux in horizontal direction, and rotates the laser beam at constant speed.

The slip-form paving machine 2 has beam detectors 17a, 17b, 17c and 17d, and each of the beam detectors 17a, 17b, 17c and 17d has a communication unit 39 for detector.

GPS devices 20a, 20b, 20c and 20d are integrally mounted on the beam detectors 17a, 17b, 17c and 17d respectively, or the GPS devices are disposed at positions closer to the beam detectors. The GPS devices 20a, 20b, 20c and 20d acquire standard time based on signals from the satellite.

Each of the beam detectors 17a, 17b, 17c and 17d has a photodetection sensor 14, which is long in up-and-down direction. The photodetection sensor 14 receives the laser beam 8 and can detect the laser beam 8 and can detect a position of photodetection (position in up-and-down direction).

A height of reference position of the photodetection sensor 14 (e.g. position at the center in vertical direction of the photodetection sensor 14) is set to the same height when the slip-form paving machine 2 is at horizontal position, and the height of reference position and a position in a horizontal plane of each of the photodetection sensors 14 are already known with respect to a device reference position of the slip-form paving machine 2 (e.g. the center of installation of a screed 15). That is, three-dimensional position of the reference position of the photodetection sensor 14 with respect to the device reference position is already known.

When the laser beam 8 crosses the beam detectors 17, each of the beam detectors 17 detects the laser beam 8, and the time when the laser beam 8 is detected is acquired from the GPS device 20. To the photodetection signal detected by the beam detector 17, a time stamp is put at the time of detection. Then, an identification signal is added, and the photodetection signal is sent to a machine control device 13.

At the a machine control device 13, the time of photodetection (photodetection timing) at a position of each of the beam detectors 17a, 17b, 17c and 17d can be acquired based on time stamps of photodetection signals and identified signals, and a difference of photodetection time of the beam detectors 17a, 17b, 17c and 17d is calculated.

From the time difference of photodetection time and from the position of each of the beam detectors 17a, 17b, 17c and 17d, a posture (direction) of the slip-form paving machine 2 with respect to the laser surveying instrument 1 can be calculated.

For instance, if the slip-form paving machine 2 faces directly to the laser surveying instrument 1, a photodetection time difference between the beam detector 17a and the beam detector 17c is equal to a photodetection time difference between the beam detector 17b and the beam detector 17d.

Further, based on the photodetecting position (height) on each of the beam detectors 17a, 17b, 17c and 17d as detected by the photodetection sensor 14, the posture of the slip-form paving machine 2 with respect to the horizontal direction can be calculated. Based on a calculation result of direction and a calculation result of posture with respect to the horizontal plane about the slip-form paving machine 2, the posture of the slip-form paving machine 2 can be controlled by the machine control device 13.

As a result, by detecting the laser beam 8 by means of the beam detectors 17a, 17b, 17c and 17d, it is possible to execute posture control of the slip-form paving machine 2.

The invention claimed is:

1. A construction machine control method, comprising:
a step of projecting a distance measuring light using a laser surveying instrument towards a target provided at a known point with respect to a device reference position of a construction machine, tracking said target by receiving a reflection light from said target and measuring a three-dimensional coordinate and a distance of said target with respect to said laser surveying instrument,
a step of projecting a laser beam in rotary irradiation at constant speed and forming a laser reference plane by said laser surveying instrument installed at a known point,
a step of detecting said laser beam by at least three beam detectors which are installed at known positions of said construction machine operated within a photodetection range of said laser beam and each has a photodetector to receive said laser beam,
a step of obtaining a photodetection timing and a horizontal angle of each of said at least three beam detectors based on results of detection of said laser beam by said at least three beam detectors,
a step of calculating a posture direction of said construction machine with respect to said laser surveying instrument based on said obtained at least three photodetection timings, horizontal angles, and the distance of the target,
a step of calculating a three-dimensional coordinate of said device reference position, direction of said device reference position, tilting amount of said device reference position, and tilting direction of said device reference position based on said measured three-dimensional coordinate of the target and said calculated posture direction of said construction machine, and
controlling a working mechanical unit of said construction machine so that said construction machine and said device reference position is set to a condition as required to carry a machine operation based on said calculated three-dimensional coordinate of said device reference position, said direction of said device reference position, said tilting amount of said device reference position, and said tilting direction of said device reference position.

2. A construction machine control method according to claim 1, wherein said horizontal angle of each of said beam detectors with respect to said laser surveying instrument is obtained based on said photodetection timing of each of said at least three beam detectors.

3. A construction machine control method according to claim 1, wherein cross-section of luminous flux of said laser beam is in spot-like shape, each of said photodetectors of said beam detectors has a predetermined length in up-and-down direction, and said construction machine control method further comprises a step of detecting photodetecting positions of said laser beam by said beam detectors and detecting heights of said beam detectors based on said photodetecting position, and a step of calculating the tilting amount and the tilting direction of said device reference position based on at least three results of detection of the height.

4. A construction machine control method according to claim 1, wherein there is provided a GPS device corresponds to each of said beam detectors, and said construction machine control method further comprises a step of acquiring time of the moment when said beam detector detects said laser beam from said GPS device as a time stamp, and of putting a time stamp to each of the photodetection signals of the beam detectors, and said photodetection timing is acquired by said time stamp.

5. A construction machine control method according to claim 1, comprising a step of projecting a modulated light as modulated to a predetermined frequency by said laser surveying instrument, a step of detecting a modulated frequency from said modulated light, and of acquiring a time moment when said beam detector receives said laser beam by using said modulated frequency as a time stamp.

6. A construction machine control method according to claim 5, wherein said modulated light is the distance measuring light.

7. A construction machine control method according to claim 6, wherein the modulated frequency for preparing the time stamp is further superimposed on said distance measuring light.

8. A construction machine control method according to claim 1, further comprising a step of detecting loci of moving of said construction machine based on a measurement result of said device reference position.

9. A construction machine control system, comprising:
a laser surveying instrument installed at a known point and a construction machine for operating in a photodetection range of said laser surveying instrument,
wherein said laser surveying instrument has a laser rotary projecting unit which projects a laser beam in rotary irradiation at constant speed and an electronic distance measuring instrument which has a tracking function and projects a distance measuring light towards a target and measures a three-dimensional coordinate to determine a distance of said target with respect to said laser surveying instrument based on a reflection light from said target,
wherein said construction machine comprises:
a working mechanical unit for carrying out construction operation,
a machine control device for controlling said working mechanical unit,
at least three beam detectors which are disposed at known positions with respect to a device reference position of said construction machine and each has a photodetector for receiving said laser beam, and
said target which is disposed at a known position with respect to said device reference position,
wherein a posture direction of said construction machine is calculated based on a determined photodetection timing and determined horizontal angle of each of said beam detectors, and said determined distance of the target, and calculating a three-dimensional coordinate of said device reference position, direction of said device reference position, tilting amount of said device reference position, and tilting direction of said device reference position based on said measured three-dimensional coordinate of the target said calculated posture direction of said construction machine, and
said machine control device controls said working mechanical unit so that said construction machine and said device reference position is set to a condition as required to carry a machine operation based on said calculated three-dimensional coordinate of said device reference position, said direction of said device reference position, said tilting amount of said device reference position, and said tilting direction of said device reference position.

10. A construction machine control system according to claim 9, wherein said construction machine has a machine communication unit, said laser surveying instrument has a surveying control device and a surveying communication unit, a posture control unit is provided on either one of said construction machine or said laser surveying instrument, one of said at least three beam detectors transmits result of photodetection of said laser beam to said laser surveying instrument or said machine control device and obtains a horizontal angle of each of said beam detectors based on photodetection timing of each of said beam detectors, said posture control unit determines direction of said construction machine based on the horizontal angle.

11. A construction machine control system according to claim 9,
wherein cross-section of luminous flux of said laser beam is in spot-like shape, each of said photodetectors has a predetermined length in up-and-down direction, and said laser surveying instrument or said machine control device detects height of each of said beam detectors based on the result of photodetection by each of said beam detectors, calculates the tilting amount and the tilting direction of said device reference position based on the detected height.

12. A construction machine control system according to claim 9, wherein GPS devices are installed respectively correspond to said beam detectors, time of the moment when said beam detectors receive said laser beam is detected from said GPS device as a time stamp, and horizontal angle of each of said beam detectors is obtained according to the time stamp added to results of photodetection.

13. A construction machine control system according to claim 9, wherein said laser surveying instrument projects a distance measuring light as modulated, said target has a photodetection element to detect said distance measuring light, said machine control device detects modulated wave from a signal outputted from said photodetection element, said modulated wave is used as a time stamp at a moment when said beam detector detects said laser beam, and horizontal angle of each of said beam detectors is obtained based on the time stamp corresponding to the result of photodetection.

14. A construction machine control system according to claim 13, wherein said target incorporates a prism inside, wherein a hole penetrating a center of said prism is provided and said photodetection element is provided at one end of said hole.

15. A construction machine control system according to claim 9, wherein an error curve is obtained in advance over total circumference with respect to an elevation angle which said beam detectors can detect by detecting said laser beam, and said laser surveying instrument or said machine control device corrects a height thus detected according to said error curve.

* * * * *